United States Patent

[11] 3,579,769

[72] Inventor Akira Matsushita
1088-312, Kitakase, Kawasaki-shi, Kanagawa-ken, Japan
[21] Appl. No. 800,506
[22] Filed Feb. 19, 1969
[45] Patented May 25, 1971
[32] Priority Feb. 19, 1968, Feb. 19, 1968
[33] Japan
[31] 43/10241 and 43/12483

[54] CAPACITORS AND PRODUCTION THEREOF
11 Claims, 11 Drawing Figs.
[52] U.S. Cl. ............................................. 29/25.42, 204/56
[51] Int. Cl. ............................................. H01g 13/00
[50] Field of Search ..................................... 29/25.42; 204/56; 117/201, (Inquired)

[56] References Cited
UNITED STATES PATENTS

| | | | |
|---|---|---|---|
| 2,281,602 | 5/1942 | Ruben | 317/258 |
| 3,290,761 | 12/1966 | Ho | 29/25.42X |
| 3,348,284 | 10/1967 | Gallet et al. | 29/25.42 |
| 3,350,760 | 11/1967 | Kilby | 29/25.42 |
| 3,457,614 | 7/1969 | Tibal | 29/25.42 |
| 3,469,294 | 9/1969 | Hayashi et al. | 29/25.42 |
| 1,925,307 | 9/1933 | DeBoer | 204/56X |
| 2,928,776 | 3/1960 | Puppolo | 204/56X |
| 3,484,344 | 12/1969 | Spiller | 204/56X |
| 3,496,424 | 2/1970 | Behrend | 204/56X |

Primary Examiner—John F. Campbell
Assistant Examiner—R. B. Lazarus
Attorneys—Robert E. Burns and Emmanuel J. Lobato ABSTRACT: Capacitors, each having a high-molecular dielectric layer electrode-positioned on at least one of two opposite electrodes thereof and having various excellent properties such as heat-resistivity, moisture-resistivity, high breakdown voltage, and high insulating resistivity, are adaptable to mass-production, miniaturization, and large capacitances. The high-molecular dielectric layer is manufactured by the method of passing a direct current on a current obtained by superposition of a direct current and an alternating current or a rectified current between a cathode and the electrode to be deposited thereon with said dielectric layer, said electrode being used as an anode, in an electrodepositing bath consisting of a resin emulsion or resin water solution containing as its main ingredient an anionic poly-high-molecular electrolytes or in an electrode positioning bath consisting of said emulsion or water solution in which a dielectric material consisting of powdery fine crystal particles or corpuscles is mixed, thereby to deposit a high-molecular dielectric layer on said anodic electrode, and subjecting said electrodeposited layer, successively, to after-treatments such as washing, drying, and polishing treatments.

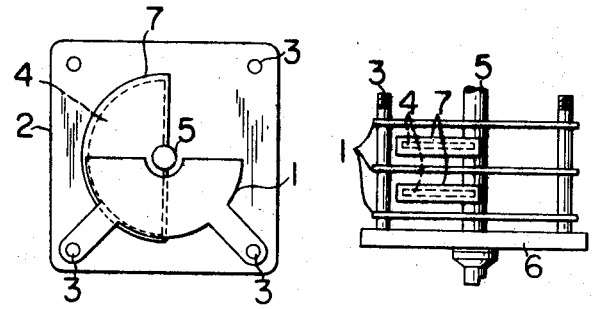
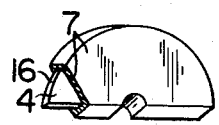
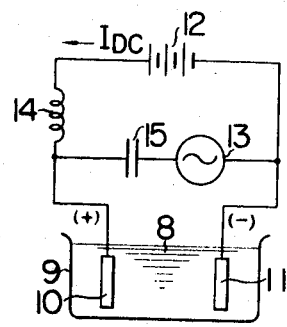
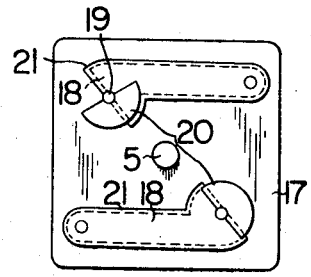
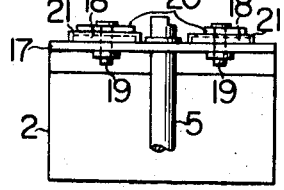

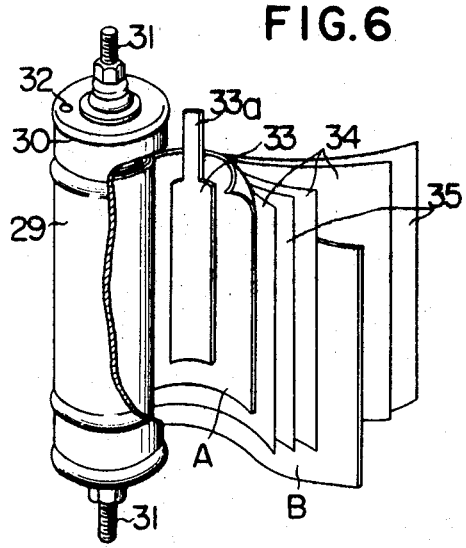
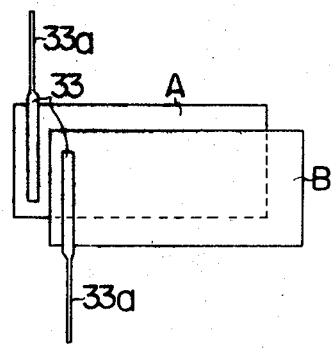
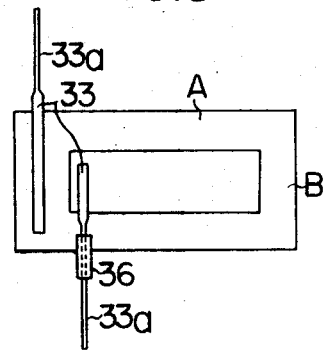
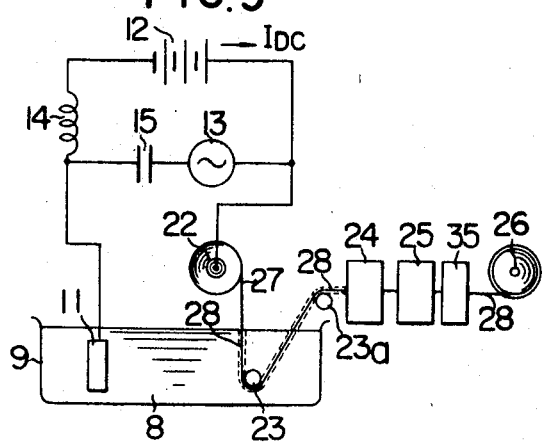
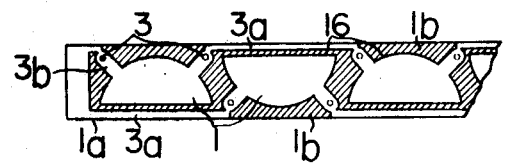

CAPACITORS AND PRODUCTION THEREOF

BACKGROUND OF THE INVENTION

The present invention relates to capacitors applicable for various electric devices and electronic devices and to a method for the production thereof.

Heretofore, various kinds of capacitors having various constructions have been proposed, but their constructional principle resides generally in that a gaseous, liquid or solid dielectric sheet or film is inserted between opposite electrodes of a pair. Furthermore, for the purpose of manufacturing a miniature capacitor having a high capacitance, it has been proposed to insert a resinous high-molecular sheet or film between two opposite electrodes or to bond to or apply on said sheet or film on the surface of at least one of said opposite electrodes. However, in the capacitors in which a high-molecular sheet having a width wider than surface area of the electrode is inserted between the opposite electrodes, irregular contact with the electrode surface is liable to occur because of undesirable warp and or nonuniform uneveness of said sheets thereby to cause howling, tracking irregularity, and static noise.

Furthermore, rotary-type capacitors having generally such disadvantages as the necessity for using a dielectric sheet having a relatively large thickness in anticipation of possible damage caused by abrasion of said sheet, or in the capacitors in which the high-molecular sheet is merely bonded adhesively to the electrode surface, unification of the kind and thickness of the adhesive is difficult. On the other hand, in capacitors in which the high-molecular sheet is formed by painting or spraying high molecular material on the electrode surface, nonuniformity of thickness of the sheet and production of pin-holes caused by volatilization of the solvent cannot be avoided.

Furthermore, since no appropriate film or sheet having extremely high dielectric constant has heretofore been developed, it has been proposed, with the object of improving the apparent dielectricity of the high-molecular film or sheet, to blend ceramic powder having high dielectric constant, for example, powder of titanium oxide or titanate with the general high-molecular material for preparing the film or sheet. In this case, however, improvement of dielectricity in practice is relatively lower than the theoretical value because the influence due to air gap becomes increasingly pronounced with increase in the blended amount of the material having a high dielectric constant. Furthermore, the film or sheet prepared by the above-mentioned mixture is relatively brittle, so that it is difficult to wind up the film or to form a very thin and wide sheet.

SUMMARY OF THE INVENTION

It is therefore the primary object of the present invention to provide capacitors of various types which are adaptable to mass-production, miniaturization, and large capacitances and have various excellent properties such as heat-resistivity, moisture-resistivity, high dielectric strength, high insulating resistivity, and high breakdown voltage.

It is another object of the present invention to provide a method for manufacturing capacitors having excellent properties as described in above-mentioned primary object.

BRIEF DESCRIPTION OF THE DRAWINGS

The foregoing objects and other objects as well as the characteristic features of the invention will become more readily understandable from the following description and the appended claims when read in conjunction with the accompanying drawings, in which the same or equivalent members are designated by the same reference numerals, and in which:

FIG. 1 (A) is a plan view of a capacitor according to the present invention;

FIG. 1 (B) is a side view of the capacitor illustrated in FIG. 1 (A);

FIG. 2 is a perspective view, partly in section, of a rotary electrode of the capacitor illustrated in FIGS. 1 (A) and (B);

FIG. 3 is a plan view of stationary electrodes of a capacitor according to the inventions, said view showing a manner of electrodepositing a dielectric layer on each of said stationary electrodes in a continuous or simultaneous process;

FIG. 4 is an electric circuit diagram of an apparatus adapted to carry out electrodeposition in the manufacturing of the capacitor illustrated in FIGS. 1 (A) and (B);

FIG. 5 (A) is a plan view of another capacitor according to present invention;

FIG. 5 (B) is a side view of the capacitor illustrated in FIG. 5 (A);

FIG. 6 is a perspective view, partly in section, of a wound-type capacitor according to the present invention;

FIGS. 7 and 8 are developed views showing terminals of other modifications of the capacitor illustrated in FIG. 6; and FIG. 9 is an electric circuit diagram of another apparatus adapted to carry out electrodepositions in the manufacture of the capacitor illustrated in FIG. 6.

Referring to FIGS. 1 to 4, the variable capacitor of rotary electrode type shown therein comprises a casing 2 having a baseplate 6, stationary posts or pins 3 erectly fixed to the baseplate, a plurality of stationary electrodes 1 supported by pins 3 or a support frame (not shown), a rotary shaft 5 supported by the baseplate and the casing in a conventional manner, and a plurality of rotary electrodes 4 supported by rotary shaft 5, the electrodes 1 being opposite to the electrodes 4, and plural pairs of the two kinds of the electrodes being superposed, whereby a variable capacitor is formed. Each of the rotary electrodes 4 is provided at its surface with a uniform layer 7 made of a high-molecular dielectric material, this layer being electrodeposited on the surface prior to combination of various parts of the capacitor. In the capacitor illustrated in FIGS. 1 to 3, the layer 7 is formed on the surface of each of the rotary electrodes, but layer 7 may be formed on the surface of each of the stationary electrodes, or both kinds of the electrodes may be provided on their surfaces with the layer 7.

Electrodeposition of the layer 7 can be attained by the following method. That is, an anionic electrodepositing bath consisting of a resin emulsion or resin water solution containing a high-molecular material such as water-soluble melamine series, stylene series or water-soluble alkyd series, or a water solution consisting of said anionic electrodepositing bath and a strong dielectric material such as titanium oxide, barium titanate or boundary electrolyte in an electrolytic cell 9 as shown in FIG. 4. The electrode on which the high-molecular dielectric layer is to be deposited, for example, the electrode 1 to 4 is, after having been previously subjected to a pretreatment such as edge treatment, surface polishing treatment such as electrolytic polishing and chemical polishing or rough surface treatment, put as an anode 10 in the above-mentioned electrolytic cell 9 and a direct current I is supplied between said anode 10 and a cathode 11 provided in said cell from a direct current power source 12, whereby a high-molecular dielectric layer is electrodeposited on the surface of the anode 10. This layer is then subjected to washing treatment, heat treatment or other solidifying treatment and, if necessary, to surface polishing treatment, whereby a uniform high-molecular dielectric layer 7 is obtained.

In the formation of the dielectric layer 7, if an alternating power source 13 (or any pulse source, rectified current source not shown) is provided besides the power source 12 so as to pass a current corresponding to superposition of a direct current and a variable current and said superposed current is utilized to electrodeposition of the layer 7, said electrodeposition can be effectively carried out. In the apparatus of FIG. 4, the numerals 14 and 15 designate, respectively, a choke coil and a capacitor for checking the direct current component.

A method of carrying out electrodeposition of the layer 7 on a plurality of the electrodes 1 in a continuous or simultaneous manner will be described in connection with FIG. 3. In this case, a plurality of the electrodes which are mutually connected at their lug portions is punched out from a metal sheet and then subjected to the electrodeposition as described in connection with the apparatus of FIG. 4. After this electrodeposition, the electrodes are cut off from one another and then assembled to construct a capacitor.

In the case of constructing capacitors as illustrated in FIGS. 1 to 3, if any particular portions of the electrode surface or lug portions of the electrode, said lug portions being adapted to be connected to and fixed on the support pin 3, are previously subjected to insulation treatment, and then said electrode is subjected to the above-mentioned electrodeposition treatment, the desirable dielectric layer can be easily and correctly formed on only the exposed metal portion except said particularly insulated portions.

As described above, the electrodepositing method according to the invention is very effective for forming the dielectric layer of any capacitor which is of relatively small type and requires a dielectric layer having uniform thickness. However, if the electrode is subjected to a heat treatment just after it is taken out of the electrolytic cell, resin-flowing or resin-shifting towards edge and end portions will occur owing to contraction of the resinous substance even when an electrodeposited layer of uniform thickness is uniformly deposited on said edge and end portions and side surfaces of the electrode. This advantage increases with increase of thickness of the electrodeposited layer. This disadvantage can be removed by holding the electrode, just after it has been subjected to electrodepositing treatment and succeeding washing treatment or further having been subjected to heat treatment of a short time adapted to maintain the resinous substance in its sintered state, between mirrorlike smooth heating plates, and subjecting said held electrode to press-drying. This press-drying can be carried out in vacuum chamber or in a specified low pressure gas or said press-drying can be attained by continuously passing the electrode through heated rolls.

Another modification of the embodiment of the invention illustrated in FIG. 3 will be described below. Referring to FIG. 3, all parts of the surface of a metal sheet 1a are, prior to its punching-out, previously and primarily subjected to electrodepositing treatment and succeeding heat treatment as described already, thereby to deposit a dielectric layer of a desired thickness on said metal sheet. From this metal sheet treated as described above, individual electrodes 1 or plural electrodes connected by their lug portions 3a and connecting pieces 3a are punched out. In this case, the border edge portions can be removed together with the frame portions as shown by hatching 1b. Then, the above-mentioned punched-out electrodes are subjected to secondary electrodepositing treatment as in the case of primary treatment, whereby circumferential side surfaces 16 and incompletely electrodeposited portions of the electrodes are electrodeposited with the dielectric layer.

Effects due to flowing and contraction of the resinous material at the side surfaces 16, said flowing and contraction occurring in the secondary treatment, has no direct relation to the flat surfaces of the electrodes 1, so that according to the above-mentioned two-step treatment, a dielectric layer having uniform thickness throughout whole portions of the electrodes can be easily obtained.

Removal of thickness nonuniformity or transformation of the electrodeposited layer, said nonuniformity or transformation being produced at edge portions and curved portions owing to flowing or contraction of the resinous material in the course of the heat treatment, may be effectively attained within a very short time by irradiation of said portions by an electron beam.

Since the electrodepositing method adopted in the present invention has an excellent characteristic in its so-called throwing power capable of carrying out uniform electrodeposition throughout narrow slits or gaps, it is possible to previously assemble the stationary electrodes and rotary electrodes in superimposed positions as a capacitor and then to carry out the electrodepositing treatment in one step, thus greatly facilitating mass-production of the capacitors.

As a whole, according to the electrodeposition method of the invention, there is an essential advantage whereby desirable electrodeposition can be effectuated at complicated portions such as the circumferential periphery 16 of the electrode to be treated or cut slots or slits provided on said the electrode.

The embodiment of the invention illustrated in FIG. 5 relates to a trimmer capacitor comprising stationary electrodes 18 affixed to an upper cover 17 of a casing 2 and rotary electrodes 20 supported by a rotary shaft 19 so as to be opposite to said stationary electrodes. In this example, the rotary electrodes 20 are provided, at their surfaces opposite to the stationary electrodes 18 and their side edge surfaces, with high-molecular dielectric layers 21 which are electrodeposited thereon in the same manner as that described in connection with the example of FIG. 1. In this example of FIG. 5, a spring force may be applied from the upper side by means of the rotary electrodes or their fittings.

The embodiment of the invention shown in FIG. 6 relates to a wound-type capacitor. This capacitor comprises mutually opposite electrode sheets A and B, and fibrous or organic resinous sheet inserted between said sheets A, B with the object of improving electrical and thermal properties, said sheets being wound together to form the capacitor.

The inserted sheet consists of a craft-paper sheet 34 adjacent to the electrode sheet A and mica sheets 35 inserted between said sheet 34 and the electrode sheet B. This inserted sheet may be omitted in some cases.

According to the present invention, at least one of the electrode sheets A and B is provided, at its surface, with a high-molecular dielectric layer electrodeposited thereon, said layer consisting of the same material and being deposited by the same method as those described in connection with the example of FIG. 1.

In the example of FIG. 6, an electrode connector 33 having an electrode terminal 33a is attached to the electrode sheet A by means of mere contacting or welding. The electrode connector 33 is preferably provided, at its rear and side surfaces, with high-molecular dielectric layer's electrodeposited thereon. The electrode terminal 33a is connected to a lead terminal 31 attached to a cover 30 of the casing 29. A hole 32 provided on the casing 29 is utilized for vacuum treatment of the sealed casing or for pouring a filling agent into said casing.

FIG. 7 shows developed electrodes of another modification of the embodiment of FIG. 6. In the embodiment of FIG. 7, both surfaces of at least one of the electrode sheets A and B, or the same side surfaces of the electrode sheets A and B are provided with dielectric layers electrodeposited thereon.

In the embodiment of FIG. 8, the electrode sheet B is made smaller than the other electrode sheet A. In this embodiment, there is the risk of a short-circuit occurring between the lead terminal 33a of the electrode connector 33 of the electrode sheet B and the electrode sheet A. For the purpose of preventing such short-circuiting, an insulating piece 36 may be placed between the lead terminal 33a and the electrode sheet A or insulation treatment may be previously applied on the rear side of the lead terminal 33a.

The electrode sheet provided with a high-molecular dielectric layer electrodeposited thereon can be easily manufactured according to the apparatus and method as will be described hereinbelow in connection with FIG. 9. In FIG. 9, guide rolls 23 and 23a are provided at positions in and outside of an electrolytic cell 9 containing an electrolyte 8 which is the same as that used in the apparatus illustrated in FIG. 4. An electrode sheet 27 wound around a bobbin 22 is passed through the electrolyte by way of the guide roll 23 and then wound around another bobbin 26 provided at the position outside the electrolytic cell 9. An electrode 11 is used as a cathode, and the electrode sheet 27 wound around the bobbin 22 is used as an anode. When a current is supplied between the cathode and anode from the same electric sources 12 and 13 as those illustrated in FIG. 4, the electrode sheet 27 taken out from the electrolytic cell 9 becomes a sheet 28 having a high-molecular dielectric layer electrodeposited thereon and then wound up around the bobbin 26. Between the bobbin 26 and the outside guide roll 23a, necessary devices such as a washing device 24, a heat-treating device 25, and a polishing device 35 such as a press-heating device may be provided.

In the above embodiment, if one or both (in the case where both electrode sheets are to be subjected to electrodeposition treatment) of the electrode sheets of a pair are successively introduced into the electrolytic cell and then both electrode sheets are pressed to each other at the portion where the treated sheet or sheets have been taken out from the electrolytic cell and then subjected to solidifying treatment, or both electrode sheets are, after being taken out from the electrolytic cell, subjected to said solidifying treatment while being pressed to each other, a wound-type capacitor having a large effective capacitance and having no airgap can be obtained.

In the case of the embodiments of the invention shown in FIGS. 6 to 9, also, if the particular portions of the electrode sheets are previously coated by an insulating coating material capable of being easily removed by a solvent as in the embodiments of FIGS. 1 and 2, and then said previously coated electrode sheets are subjected to the electrodepositing treatment, particular exposed portions can be formed on the electrode sheets. These exposed portions may be effectively utilized to bond on and connect electric parts such as the electrode connectors 33, resistors, semiconductor elements and other electric circuits thereto.

The thickness of the high-molecular dielectric layer according to the invention can be controlled at will within the range from several microns to several tens of microns by suitable selection of the composition of the electrolyte and electrodepositing conditions. Furthermore, desired mechanical and electrical properties of the dielectric layer can be obtained by suitable selection of the kind and composition of the electrolyte.

In conventional capacitors in which a high-molecular sheet is inserted between electrodes or caused to adhere to the electrode surface, the thickness of said sheet is limited to a relatively large range from several tens of microns to 150 microns, whereby a limitation has been imposed on the manufacture of capacitors having high efficiency and large capacitance because the electrode distance cannot be decreased to a value smaller than a certain limiting value.

According to the present invention, however, since a high-molecular dielectric layer having uniform and extremely thin thickness can be formed as desired at all portions or particular portions of the surfaces of an electrode or electrodes, it is easily possible to remove any obstruction due to tracking irregularity, impact, contacting, vibration, etc. Furthermore, the electrodeposited layer of this invention functions as a protective film against rust and corrosion.

In the variable capacitors as illustrated in FIGS. 1 and 5, allowable error of the variable capacity is below 1 PF (1 percent), breakdown voltage is above 100 volt (100 MΩ), miniaturization is very easy, and mass production is possible because of simple assembling of the parts. Furthermore, since corona voltage of the capacitors according to the present invention is very high, the capacitance characteristic of these capacitors is very stable within the range including higher frequency bands. When a certain solid component is electrodeposited on the basic metal anode as in the case of the present invention, current conductivity of the coated positions disappears inherently, and pin-holes, cracks, and other defects are not produced in the coated film, so that a strongly and closely deposited film can be formed within a very short time.

There is no limitation in the kind of the electrode metal of the capacitors according to the present invention and accordingly aluminum, copper, iron and their alloys may be used as said electrode metal, as in the conventional cases. Of course, when copper is used, it is preferable to plate the copper with an inert metal such as cadmium to remove the obstruction caused by copper ions. Furthermore, according to the present invention, capacitors of any type such as variable capacitors of ganged type or laminated-type capacitors can be simply manufactured without changing the conventional forms, shapes of the parts and construction method.

The present invention is not limited to the above-described embodiments thereof but may be embodied in other modifications within the scope of the subject matter of the invention.

For example, when bubbles are mixed in the high-molecular dielectric layer, Q (reciprocal of tan ζ) can be extremely improved, so that if it is required to make Q high, it is preferable to mix micropowder of a formable material such as formable styrol or mica powder containing bubbles in the dielectric layer. Furthermore, sometimes it is required that the capacitance-temperature coefficient of the capacitors manufactured according to the present invention be zero, positive or negative depending upon the use, such as temperature-compensation of an electric circuit. The requirement as described above can be easily attained by the electrodepositing a resinous dielectric layer comprising a polyester series material having a positive temperature-coefficient and a styrol series material having a negative temperature-coefficient on the electrode or by electrodepositing different resinous materials, respectively, on different surfaces of the electrode or by laminating several electrodes having, respectively, different kinds of the dielectric layers electrodeposited thereon. Of course, the requirement as described above can be attained by mixing, in suitable combination, a material having a positive capacitance-temperature coefficient such as titanium oxides or steatite ceramics and a material having a negative capacitance-temperature coefficient such as barium titanate ceramics in the material forming the high-molecular dielectric layer.

I claim:

1. A method of manufacturing a capacitor comprising placing at least one of the opposing electrodes of the capacitor as an anode and a separately disposed cathode in an electrolytic cell containing therein an electrolyte containing as its main ingredient an ionic high-molecular material, passing a unidirectional current through said anode and cathode in said cell thereby to electrodeposit a high-molecular dielectric layer on a desired portion of the surface of said anode, subjecting said dielectric layer to succeeding washing and drying treatments, and then assembling the opposing electrodes to manufacture a complete capacitor in which said high-molecular dielectric layer is disposed between said electrodes, said anionic high-molecular material of said electrolyte being a resin material selected from the group consisting of a water soluble resin of the melamine series, a water soluble resin of the stylene series and a water soluble resin of the alkyd series.

2. A method of manufacturing a capacitor as claimed in claim 1, in which the current used as the electrodepositing current is prepared by superposition of a direct current and a varying current selected from the group consisting of an alternating current, pulse current and rectified current.

3. A method of manufacturing a capacitor comprising placing at least one of the opposing electrodes of the capacitor as an anode and a separately disposed cathode in an electrolytic cell containing therein an electrolyte containing as its main ingredient an anionic high-molecular material, passing a unidirectional current through said anode and cathode in said cell thereby to electrodeposit a high-molecular dielectric layer on a desired portion of the surface of said anode, subjecting said dielectric layer to succeeding washing and drying treatments, and then assembling the opposing electrodes to manufacture a complete capacitor in which said high-molecular dielectric layer is disposed between said electrodes, said anionic high molecular material comprising two resinous materials one having a positive temperature coefficient and the other a negative temperature coefficient, said resinous material having a positive temperature and coefficient being electrodeposited on one surface of said electrode and said resinous material having a negative temperature coefficient being electrodeposited on another surface of said electrode.

4. A method of manufacturing a capacitor as claimed in claim 3, in which said resinous material having a positive temperature coefficient is a polyester series material and said material having a negative temperature coefficient is a styrol series material.

5. A method of manufacturing a capacitor, comprising placing at least one of the opposing electrodes of the capacitor as an anode and a separately disposed cathode in an electrolytic cell containing therein an electrolyte containing an anionic high-molecular material and micropowder of a strong dielectric material, said anionic high-molecular material of said electrolyte being a resin material selected from the group consisting of a water soluble resin of the melamine series, a water soluble resin of the stylene series and a water soluble resin of the alkyd series, passing a current through said anode and cathode in said cell thereby to electrodeposit a high-molecular dielectric layer on a desired portion of the surface of said anode, subjecting said dielectric layer to succeeding washing and drying treatments, and the assembling the opposing electrodes to manufacture a complete capacitor in which said high-molecular dielectric layer is disposed between said electrodes.

6. A method of manufacturing a capacitor as claimed in claim 5, in which the electrodepositing current is prepared by superposition of a direct current and a varying current selected from the group consisting of an alternating current, pulse current and rectified current.

7. A method of manufacturing a capacitor as claimed in claim 5, in which said micropowder is selected from the group consisting of titanium dioxide, barium titanate, formable styrol and mica.

8. A method of manufacturing a wound-type capacitor comprising two opposing wound electrode sheets, which comprises winding at least one of said electrode sheets on a bobbin; unwinding and introducing continuously said wound sheet as an anode into an electrolytic cell having a cathode and containing an electrolyte containing as its main ingredient an anionic high-molecular material; said anionic high-molecular material of said electrolyte being a resin material selected from the group consisting of a water soluble resin of the melamine series, a water soluble resin of the stylene series and a water soluble resin of the alkyd series, passing a current through said electrode sheet introduced into said cell and said cathode thereby to electrodeposit a high-molecular dielectric layer on said anodic sheet; continuously taking said electrode sheet having said dielectric layer out of said cell; subjecting said sheet to succeeding washing and drying treatment; and then winding the thus treated sheet around a bobbin; and assembling the capacitor by utilizing said treated sheet or sheets as the electrode sheet or sheets of two opposing electrode sheets.

9. A method of manufacturing a capacitor as claimed in claim 8, in which the current used as the electrodepositing current is prepared by superposition of a direct current and a varying current selected from the group consisting of an alternating current, pulse current and rectified current.

10. A method of manufacturing a wound-type capacitor comprising two opposing wound electrode sheets, which comprises winding at least one of said electrode sheets on a bobbin; unwinding and introducing continuously said wound sheet as an anode into an electrolytic cell having a cathode and containing an electrolyte containing an anionic high-molecular material and micropowder of a strong dielectric material; said anionic high-molecular material of said electrolyte being a resin material selected from the group consisting of a water soluble resin of the melamine series, a water soluble resin of the stylene series and a water soluble resin of the alkyd series, passing a current through said electrode sheet introduced into said cell and said cathode thereby to electrodeposit a high-molecular dielectric layer on said anodic sheet, continuously taking said electrode sheet having said dielectric layer out of said cell; subjecting said taken-out sheet to succeeding washing and drying treatment; and then winding the thus treated sheet around a bobbin; and assembling the capacitor by utilizing said treated sheet or sheets as the electrode sheet or sheets of two opposing electrode sheets.

11. A method of manufacturing a capacitor as claimed in claim 10 in which the current used as the electrodepositing current is prepared by superposition of a direct current and a varying current selected from the group consisting of an alternating current, pulse current and rectified current.